United States Patent [19]  [11] 4,179,156
Huisman  [45] Dec. 18, 1979

[54] VEHICLE SUN ROOF COVER

[75] Inventor: Marinus Huisman, Braunschweig, Fed. Rep. of Germany

[73] Assignee: Volkswagenwerk Aktiengesellschaft, Wolfsburg, Fed. Rep. of Germany

[21] Appl. No.: 839,422

[22] Filed: Oct. 5, 1977

[30] Foreign Application Priority Data

Oct. 27, 1977 [DE] Fed. Rep. of Germany ....... 2648664

[51] Int. Cl.² .............................................. B60J 7/04
[52] U.S. Cl. ................................................. 296/137 B
[58] Field of Search ......................... 296/137 F, 137 B
[56] References Cited

U.S. PATENT DOCUMENTS 4,038,910  8/1977  Kneusels et al. ................ 296/137 B
4,085,965  4/1978  Schlapp ............................ 296/137 F

FOREIGN PATENT DOCUMENTS 1605960  7/1970  Fed. Rep. of Germany .......... 296/137

Primary Examiner—Joseph F. Peters, Jr.
Assistant Examiner—Norman L. Stack, Jr.
Attorney, Agent, or Firm—Brumbaugh, Graves, Donohue & Raymond

[57] ABSTRACT

A vehicle sun roof cover, capable of being displaced open and pivoted open, is provided with a rigid outer top member and an inner panel member. The panel member is made in two portions. When the cover is in its closed position, or displaced open, the two panel portions remain parallel to each other. When the cover is pivoted open, one panel portion pivots with respect to the other panel portion to provide an opening through the panel member.

6 Claims, 6 Drawing Figures

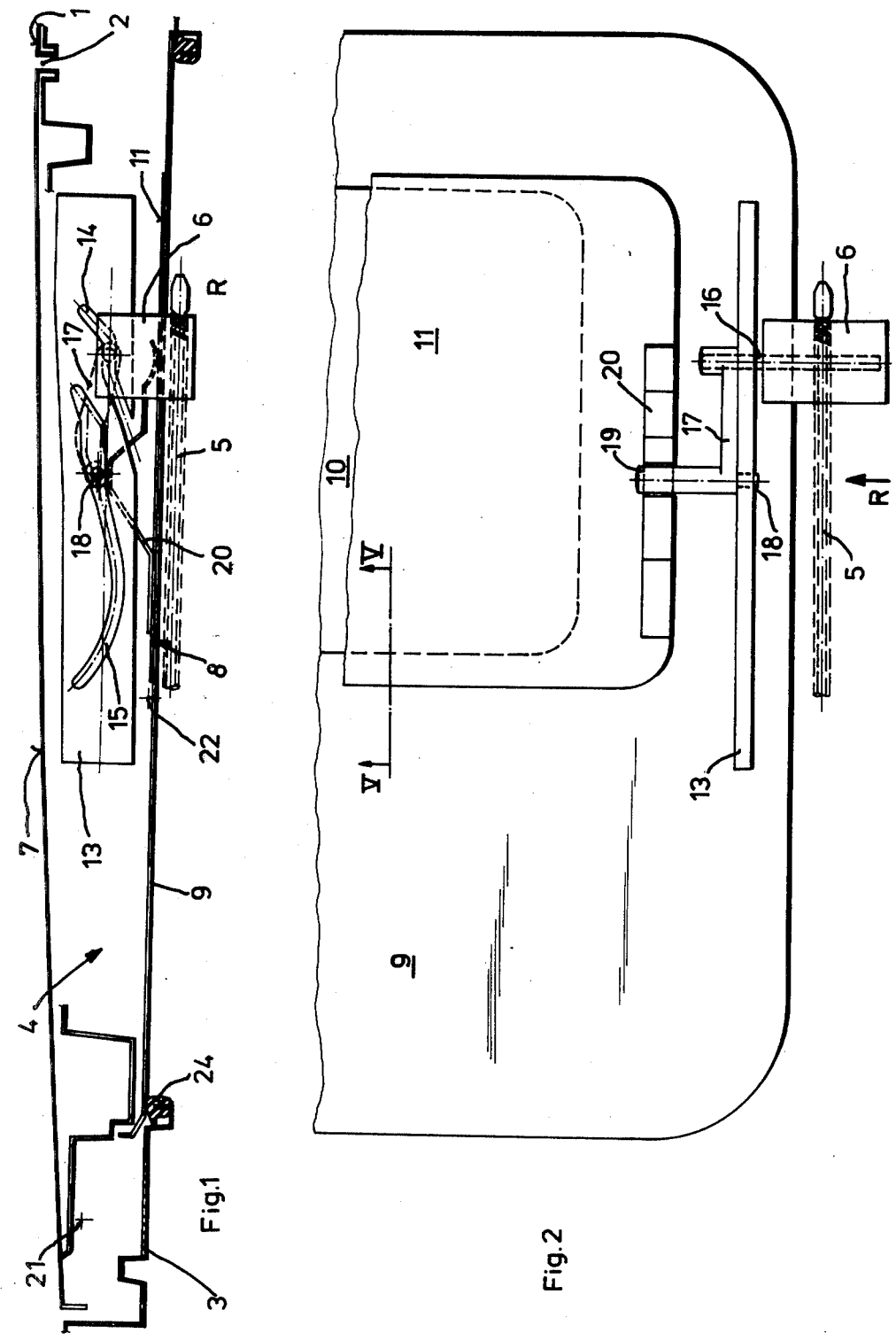

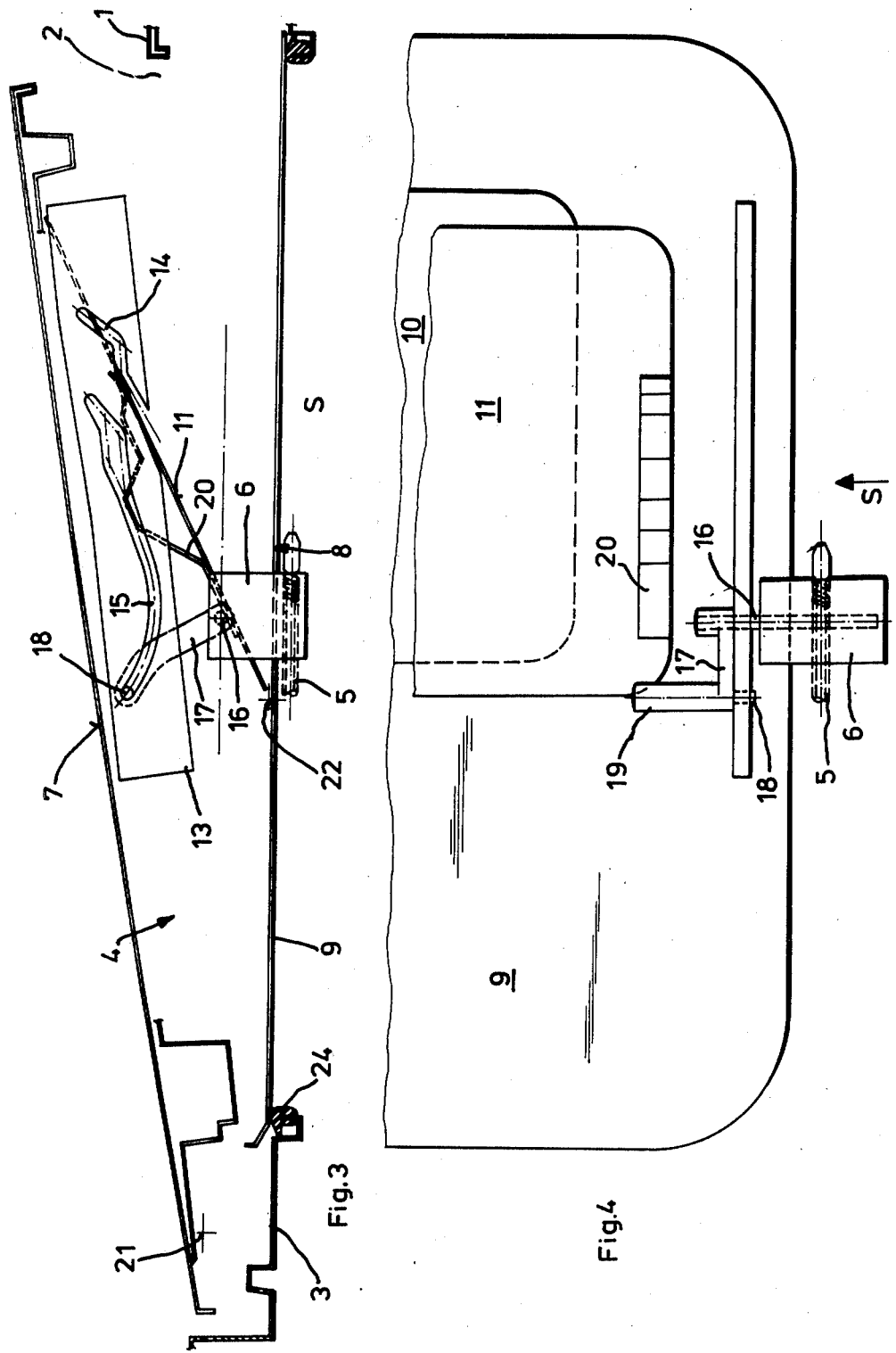

VEHICLE SUN ROOF COVER

BACKGROUND OF THE INVENTION

This invention relates to vehicle sun roof covers, particularly those capable of longitudinal displacement for opening of the vehicle roof and also capable of pivoting to vent interior of the automobile without completely opening the vehicle roof.

Prior art covers of this type are known, and one is described in published German Application No. 1,605,960. The prior art covers generally provide a rigid outer top member and an innter panel member which blends with the vehicle roof interior. The inner panel member is generally fabricated as a frame-shaped bearing member and stiffened by one or more cross struts. The underside of the panel is finished with roof lining material to blend with the vehicle interior decor. When the cover is swung open, the inner panel member, which is fixed to the roof in the front portion near the axis on which the vehicle cover pivots, is bent upward in its rear portion by taking advantage of the elasticity of the frames which form the inner panel.

The bending of the frame members, to provide the tilting operation, places considerable stress on the frame and bearing members as well as the inner panel. The forceful deformation of the bearing can result in an eventual permanent deformation of the frame and consequently a poor fit of the interior panel to the adjacent roof parts. This is particularly true where the frame is provided with an edge member to blend the inner panel to the remaining portions of the roof interior. When the frame becomes bent, the edge member no longer meets the surrounding roof portions and an objectionable gap remains when the panel is in the closed position.

The design of the interior panel must also comply with recently evolved safety regulations according to which the interior panel member, in the closed condition, must form a continuous or nearly continuous surface with the remaining portions of the roof interior. Thus, in the closed condition, the panel cannot include gaps into which a spherical test body of a determined size can penetrate to a specified depth.

It is therefore an object of the present invention to provide a new and improved cover for a vehicle sun roof wherein the cover can be pivoted outward to vent the interior of the automobile without bending the frame of the cover.

It is a further object of the invention to provide such a cover wherein the panel will remain in a close fit with the surrounding portions of the vehicle roof interior even after prolonged use of the cover.

It is a still further object of the invention to provide such a cover, which in the closed condition, forms a substantially continuous surface with the surrounding roof interior.

SUMMARY OF THE INVENTION

In accordance with the present invention, there is provided a displaceable cover for an automobile roof, capable of being longitudinally displaced to open and close a roof opening and capable of being pivoted outward from the roof opening about a first axis at one longitudinal end of the cover. The cover includes a rigid outer top member and an inner panel member. The panel member has first and second panel portions pivotably mounted to each other on a second axis transverse to the direction of the longitudinal displacement. The first panel portion is arranged to remain substantially parallel to the roof when the cover is pivoted. The second panel portion is arranged to remain parallel to the first panel portion when the cover is opened and closed and to form an angle with respect to the first panel portion when the cover is pivoted outward from the roof thereby opening a passage through the panel member.

In a preferred embodiment, the first and second panel portion each comprise a relatively flat, thin-walled member. The first panel portion can include a panel opening which is closed by the second panel portion when it is parallel to the first panel portion. The second panel portion may be retained in the position parallel to the first panel portion by retaining means coupled to a cover activating means, which permits the second panel portion to pivot away from the first panel portion under the action of a spring when the cover is tilted. The retaining means may be coupled to the cover activating means by a guide element, which also cooperates with a slide bar for regulating the pivoting of the coyer.

For a better understanding of the present invention, together with other and further embodiments, reference is made to the following description, taken in conjunction with the accompanying drawings, and its scope will be pointed out in the appended claims.

BRIEF DESCRIPTION OF THE DRAWINGS

FIG. 1 is a cross-sectional view of a roof cover in accordance with the present invention in the closed position.

FIG. 2 is a top view of the FIG. 1 cover with the outer top member removed.

FIG. 3 is a cross-sectional view of the FIG. 1 cover in the pivoted position.

FIG. 4 is a top view of the FIG. 1 cover in the pivoted position with the outer top member removed.

DESCRIPTION OF THE INVENTION

Figure 5:
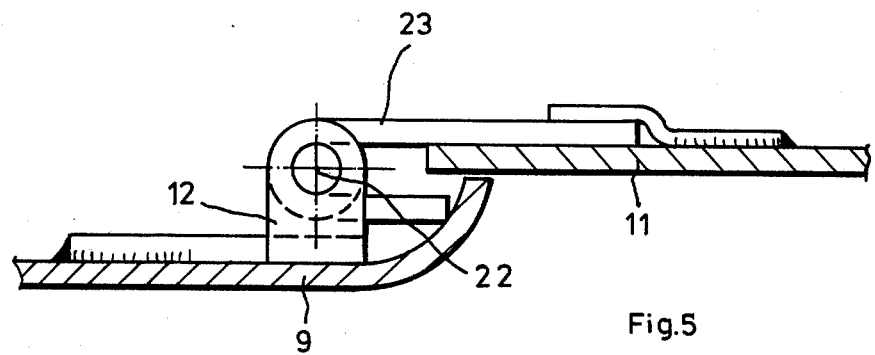
FIG. 5 is a detailed cross-sectional view of the FIG. 1 cover illustrating the hinge between the inner panel portions of the cover.

The longitudinal cross-sectional view of FIG. 1 illustrates a portion of a vehicle roof 1, which has an opening 2 for a sun roof. A frame 3 is provided which surrounds the roof opening 2 in a manner which is customary for such vehicles. Within the roof opening 2 there is provided a cover 4 which is designed to be longitudinally moved forward and aft with respect to the vehicle roof to open the sun roof, and is also designed to pivot about an axis 21 to provide a rearward facing opening and thereby vent the vehicle interior without completely opening the roof.

A roof cover activating device is mounted to the frame 3 to move the cover into its various positions. The activating device may include a lead screw 5 or cable, on which a sliding block 6 is mounted to be moved by the screw or cable in guide rails which are not illustrated in the drawing. The screw or cable may be connected to a crank or motor. This manner of activating the cover is well known in the art. The cover 4 includes a rigid outer member 7 which fits into the roof opening 2 and an innner panel member 8 which is arranged below and connected with the top member. The panel member 8 is contructed of two panel portions, a first panel portion 9 which is a substantially flat, thin-walled member having an opening 10, and a second panel member 11 which is also a substantially flat, thin-walled member, and which is arranged to fit over and close the opening 10 in the first panel member 9. The second panel portion 11 is mounted to the first panel portion 9, by a hinge connection with a second pivot axis 22. First panel portion 9 may include a cover supporting frame which engages longitudinal tracks, not shown, for guiding longitudinal movements of the cover. Outer top member 7 is connected to the frame and panel 9 by pivot axis 21 at the forward end and by the cover activating means at the rearward end.

The cover activating means includes slide bar 13, which is mounted to the outer member 7 and is provided with two guide grooves 14 and 15. Groove 14 is used predominantly for guiding the cover during the sliding operation wherein the entire cover longitudinally moves into and out of the opening. Guide groove 15 is used primarily in the tilting operation of the cover wherein the outer member 7 is pivoted about axis 21 to provide a vent opening at the rear end of the cover. A guide pin 16, which is mounted in sliding block 6, engages groove 14 of slide bar 13 and also provides a pivot axis for lever 17. Lever 17 is pivotably mounted on pin 16 and at its opposite end is provided with a guide element comprising second guide pin 18, which engages groove 15 on slide bar 13, and extension 19, which cooperates with a cam surface 20 to retain second panel portion 11 in a position parallel to the first panel portion 9 thereby closing the panel opening 10.

In order to activate the cover for movement into the open or pivoted position, the cover activating means is operated, for example by a crank mounted to frame 3 so that slide member 6 moves longitudinally forward or rearward with respect to the vehicle. In the event block 6 is moved in the rearward direction, to the right in FIG. 1, guide pin 16 will initially move to the right along groove 14 on slide bar 13 and pull the rear portion of top member 7 in a downward direction so that the top member 7 may fit below the roof 1 and the entire cover, including panel 8 slides into the recess provided in the roof for that purpose. To accommodate downward pivoting of top member 7, cam member 20 is provided with a downward sloping rear portion so that guide element extension 19 can move in a downward direction as top member 7 pivots down, and retain the second panel portion 11 in its position parallel to and closing opening 10 in first panel portion 9. The downward tilting and rearward motion of the cover upon movement of slide member 6 in the rearward direction is substantially in accordance with the operation of similar covers in accordance with the prior art.

Figure 6:
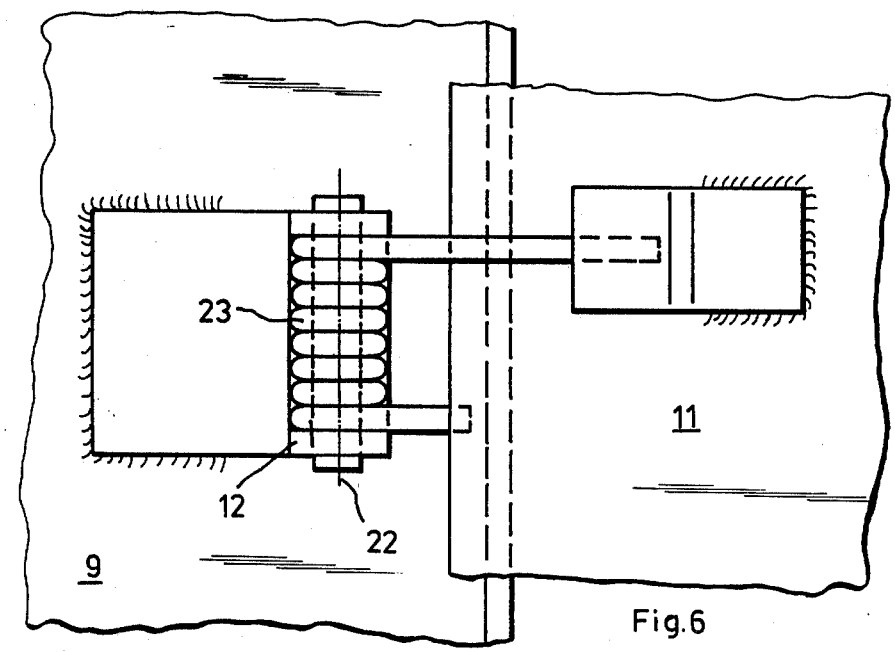
FIG. 6 is a top view of the hinge illustrated in FIG. 5.

When slide member 6 is moved forward from the closed position, guide pin 16 moves forward in groove 14 and eventually disengages slide bar 13. Simultaneously, guide pin 18 moves forward in groove 15 causing extension 19 to be disengaged from the highest portion of cam surface 20. Guide pin 18 causes an upward tilting of the outer top member 7 on axis 21 and, following the disengagement of extension 19 from cam surface 20, second panel portion 11 is permitted to tilt in an upward direction until the open position illustrated in FIG. 3 is achieved. In order to facilitate the upward tilting of second panel portion 11, it is mounted to the first panel portion 9 by means of a hinge and spring arrangement which is illustrated in detail in FIGS. 5 and 6. As shown in those figures, a hinge 12 is provided which swings on an axis 22. One hinge member is spring 23, which engages the second panel portion and, upon release of extension 19 from cam surface 20, will effect the upward tilting of second panel portion 11 and uncover opening 10 in first panel portion 9. This is illustrated in top view in FIG. 4.

It may be seen by the cross-sectional view in FIG. 3 that, in the tilted position, the outer top member 7 is tilted away from the plane of the vehicle roof while the inner panel member 8 is separated into a first panel portion 9, which remains substantially parallel to the roof, and a second panel portion 11 which is tilted with respect to the first panel portion to form an angle therewith and uncover opening 10 through the panel member.

It will be recognized that by providing first and second panel portions for the panel member, the panel member and its frame is no longer required to bend or be stressed by the pivoting of the cover. The hinged arrangement of the first and second panel portions therefore provides for a stress-free operation of the panel member when the cover is pivoted to vent the interior of the automobile. In addition to preventing stress, the arrangement enables a clean transition between the first panel portion 9 and the interior roof of the vehicle with edge member 24 and also provides an attractive closing of the opening 10 in first panel portion 9 by second panel portion 11. Thus, the operation of the panel member is divided into two separate operating edges, the sliding edge for opening of the roof provided by panel portion 9, and a second edge for venting of the vehicle interior is provided by panel portion 11, which mates with panel portion 9. Panel portion 9 is provided with a forward section which is substantially flat, thin-walled member and a rear section which is essentially a frame surrounding opening 10. This separation of the two opening functions of the panel member provides for an easier decorative treatment of the panel edges and design of the panel edges to prevent wear or bending during prolonged operation over the life of the vehicle.

The arrangement further provides compliance with the requirement that the interior roof of the vehicle be a substantially continuous structure. The construction of the first and second panel portions is such that they may easily blend with each other and with the interior of the vehicle to provide a substantially flat and continuous surface. Smaller clearance holes may naturally be provided in the structural portion of the panel portions for weight reduction, as long as these holes are not of a size which would be prohibited by safety regulations.

It should be noted that in accordance with the invention, the mechanisms which control the pivoting of the second panel portion with respect to the first panel portion is activated entirely by the usual cover activating mechanism. Thus, by the provision of extension 19 on guide pin 18, the cover activating device can be simultaneously used to retain panel portion 11 in its position parallel to and closing opening 10 in panel portion 9. The cam surface 20 which is engaged by extension 19 is arranged so that on return of slide member 6 to the closed position, extension 19 rides up a ramp on cam surface 20 and closes the second panel portion against the opening 10 in the first panel portion 9.

While there has been described what is believed to be the preferred embodiment of the invention, those skilled in the art will recognize that other and further modifications may be made thereto without departing from the spirit of the invention, and it is intended to claim all such embodiments as fall within the true scope of the invention.

I claim:

1. A displaceable cover for an automobile roof, capable of being longitudinally displaced to open and close a roof opening and having a rigid outer top member capable of being pivoted outward from said roof opening about a first axis at one longitudinal end of said cover and an inner panel member covering said opening from the vehicle interior when said cover is closed, said panel member having first and second panel portions pivotably mounted to each other on a second axis transverse to the direction of said longitudinal displacement, said first panel portion being mounted on said cover so that it remains substantially parallel to said roof at all cover positions and said second panel portions being mounted on and interacting with said cover so that it remains parallel to said first panel portion when said cover is longitudinally displaced to open and close the roof opening and so that it pivots outward on said second axis with respect to said first panel portion when said cover is pivoted outward from said roof, thereby opening a passage through said panel member.

2. A cover as specified in claim 1 wherein said first and second panel portions each comprise a substantially flat, thin-walled member.

3. A cover as specified in claim 1 wherein said first panel portion includes a panel opening and said second panel portion is arranged to close said panel opening when parallel to said first panel portion.

4. A cover as specified in claim 3 wherein said first panel portion includes a substantially flat, thin-walled section arranged forward of said panel opening, and wherein said second panel portion comprise a substantially flat, thin-walled member.

5. A cover as specified in claim 1 wherein there is provides cover activating means for opening, closing and pivoting said cover, wherein there is provided means, coupled to said cover activating means, for retaining said second panel portion in said parallel position and releasing said second panel portion to pivot on said second axis when said cover activating means pivots said cover, and wherein there is provided a spring for pivoting said second panel member when said second panel member is released by said retaining means.

6. A cover as specified in claim 5 wherein said cover activating means includes a slide bar, a guide element cooperating with said slide bar, and means for driving said guide element to move in said slide bar and thereby pivot said outer top member on said first axis, and wherein said retaining means is coupled to said guide element.

* * * * *

UNITED STATES PATENT AND TRADEMARK OFFICE
CERTIFICATE OF CORRECTION

PATENT NO. : 4,179,156
DATED : December 18, 1979
INVENTOR(S) : Marinus Huisman

It is certified that error appears in the above-identified patent and that said Letters Patent are hereby corrected as shown below:

First page, Item [30], "Oct. 27, 1977" should read --Oct. 27, 1976--;
Column 1, line 13, "innter" should read --inner--;
Column 2, line 67, "contructed" should read --constructed--;
Column 4, line 33, after "which is" insert --a--;
Column 4, line 54, "is" should read --are--;
Column 6, line 8, "comprise" should read --comprises--;
Column 6, line 11, "provides" should read --provided--.

Signed and Sealed this

Twentieth Day of May 1980

[SEAL]

Attest:

SIDNEY A. DIAMOND

*Attesting Officer*     *Commissioner of Patents and Trademarks*